US012312769B2

(12) United States Patent
Yagyu et al.

(10) Patent No.: US 12,312,769 B2
(45) Date of Patent: May 27, 2025

(54) HYBRID SYSTEM AND WORKING MACHINE INCLUDING HYBRID SYSTEM

(71) Applicant: KUBOTA CORPORATION, Osaka (JP)

(72) Inventors: Sumio Yagyu, Sakai (JP); Yuji Hirase, Sakai (JP); Kazuto Okazaki, Sakai (JP); Tsunehiro Ii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/520,713

(22) Filed: Nov. 28, 2023

(65) Prior Publication Data

US 2024/0175241 A1     May 30, 2024

(30) Foreign Application Priority Data

Nov. 29, 2022    (JP) .................................. 2022-190348

(51) Int. Cl.
*B60W 10/06*      (2006.01)
*B60K 6/365*      (2007.10)
(Continued)

(52) U.S. Cl.
CPC .......... *E02F 9/2075* (2013.01); *B60W 10/06* (2013.01); *B60W 10/08* (2013.01); *B60W 10/10* (2013.01);
(Continued)

(58) Field of Classification Search
CPC ... B60K 6/08; B60K 6/38; B60K 6/40; B60K 6/46; B60K 6/365; B60K 6/383;
(Continued)

(56) References Cited

U.S. PATENT DOCUMENTS

| | | | |
|---|---|---|---|
| 2007/0049442 A1* | 3/2007 | Long ...................... | B60K 6/445 475/5 |
| 2009/0023529 A1* | 1/2009 | Sanji ...................... | B60K 25/02 475/5 |

(Continued)

FOREIGN PATENT DOCUMENTS

| | | | |
|---|---|---|---|
| CN | 203697946 U | * | 7/2014 |
| DE | 102021109279 A1 | | 10/2022 |

(Continued)

OTHER PUBLICATIONS

Official Communication issued in corresponding European Patent Application No. 23212379.4, mailed on Apr. 22, 2024.

*Primary Examiner* — Tinh Dang
(74) *Attorney, Agent, or Firm* — Keating & Bennett, LLP

(57) ABSTRACT

A hybrid system includes an engine, a generator to be driven by the engine, an electric actuator to be driven by electricity generated by the generator, a transmission to transmit power from the engine, a hydraulic pump to receive power from the engine through the transmission to deliver hydraulic fluid, and a hydraulic actuator to be driven by the hydraulic fluid. The transmission includes a first transmission path to transmit power from the engine to the hydraulic pump when a rotational speed of the engine is a first rotational speed, and a second transmission path to transmit power from the engine to the hydraulic pump at a speed change ratio at which a rotational speed is increased to a greater degree than at a speed change ratio of the first transmission path when the rotational speed of the engine is a second rotational speed lower than the first rotational speed.

13 Claims, 8 Drawing Sheets

(51) Int. Cl.
  *B60K 6/387* (2007.10)
  *B60W 10/08* (2006.01)
  *B60W 10/10* (2012.01)
  *B60W 10/115* (2012.01)
  *B60W 10/30* (2006.01)
  *B60W 20/30* (2016.01)
  *B60W 50/08* (2020.01)
  *E02F 9/20* (2006.01)
  *B60K 6/383* (2007.10)

(52) U.S. Cl.
  CPC ........... *B60W 20/30* (2013.01); *B60K 6/383* (2013.01); *B60W 50/082* (2013.01); *B60W 2300/17* (2013.01); *B60W 2510/0208* (2013.01)

(58) Field of Classification Search
  CPC ...... B60K 6/387; E02F 9/2075; B60W 10/02; B60W 10/06; B60W 10/08; B60W 10/10; B60W 10/11; B60W 10/113; B60W 10/115; B60W 10/30; B60W 20/30; B60W 30/1882; B60W 30/1888; B60W 50/082; B60W 2300/17; B60W 2510/0208; B60W 2510/0638; B60W 2710/021; B60W 2710/0644; B60W 2300/423; B60W 2300/1888
  See application file for complete search history.

(56) References Cited

U.S. PATENT DOCUMENTS

| | | | |
|---|---|---|---|
| 2014/0148984 A1* | 5/2014 | Nishi | B60W 20/10 180/65.265 |
| 2014/0332294 A1* | 11/2014 | Soma' | B60K 6/46 180/65.245 |
| 2022/0105793 A1 | 4/2022 | Sukhatankar et al. | |
| 2023/0286368 A1* | 9/2023 | Hirase | F16H 57/0476 |

FOREIGN PATENT DOCUMENTS

| | | | | |
|---|---|---|---|---|
| JP | 4218129 B2 * | 2/2009 | ............ | B60K 3/383 |
| JP | 2020-183164 A | 11/2020 | | |

* cited by examiner

HYBRID SYSTEM AND WORKING MACHINE INCLUDING HYBRID SYSTEM

CROSS REFERENCE TO RELATED APPLICATIONS

This application claims the benefit of priority to Japanese Patent Application No. 2022-190348 filed on Nov. 29, 2022. The entire contents of this application are hereby incorporated herein by reference.

BACKGROUND OF THE INVENTION

1. Field of the Invention

The present invention relates to a hybrid system and a working machine including a hybrid system.

2. Description of the Related Art

A working machine includes two types of hydraulic systems, i.e., a drive hydraulic system for driving tires or crawlers and an auxiliary hydraulic system for an arm, a bucket, an implement, and/or the like. However, the use of hydraulic pressure for driving tires or crawlers is generally considered to be inefficient. Therefore, in order to achieve high efficiency when driving working machines, hybrid working machines which operate partially or entirely on electricity are increasingly used.

In the case of an automobile, as disclosed in Japanese Unexamined Patent Application Publication No. 2020-183164, an oil pump is used to cool a series hybrid generator or motor. Therefore, studies have been conducted to achieve sufficient flow rate and efficiency of the oil pump (hydraulic pump).

SUMMARY OF THE INVENTION

In a series hybrid vehicle in which an engine, a generator, and a hydraulic pump are connected in series, power generated by the engine is directly transmitted to the generator and the hydraulic pump, and the electricity generation by the generator and driving of the hydraulic pump are performed concurrently.

However, although the rotational speed of the engine may be changed in accordance with the output of the generator to further save energy on the hybrid vehicle, when the rotational speed of the engine is reduced, the reduced rotational speed of the engine may be appropriate for the output of the generator but may be below the rotational speed optimal for the operation of the hydraulic pump.

Example embodiments of the present invention provide hybrid systems each capable of maintaining driving of a hydraulic pump regardless of the rotational speed of an engine, and provide working machines including hybrid systems.

Technical solutions provided by one or more example embodiments of the present invention may include any of the following feature(s).

A hybrid system according to an aspect of an example embodiment of the present invention includes an engine, a generator to be driven by the engine, an electric actuator to be driven by electricity generated by the generator, a transmission to transmit power from the engine, a hydraulic pump to receive power from the engine through the transmission to deliver hydraulic fluid, and a hydraulic actuator to be driven by hydraulic fluid delivered by the hydraulic pump, wherein the transmission includes a first transmission path to transmit power from the engine to the hydraulic pump when a rotational speed of the engine is a first rotational speed, and a second transmission path to transmit power from the engine to the hydraulic pump at a speed change ratio at which a rotational speed is increased to a greater degree than at a speed change ratio of the first transmission path when the rotational speed of the engine is a second rotational speed that is lower than the first rotational speed.

The speed change ratios of the first transmission path and the second transmission path may be such that a rotational speed inputted from the first transmission path into the hydraulic pump when the rotational speed of the engine is the first rotational speed is equal or substantially equal to a rotational speed inputted from the second transmission path into the hydraulic pump when the rotational speed of the engine is the second rotational speed.

The speed change ratio of the second transmission path may be a value obtained by dividing a product of the speed change ratio of the first transmission path and the first rotational speed by the second rotational speed.

The transmission may include a first clutch in the first transmission path. The first clutch may be operable to transmit power from the first transmission path to the hydraulic pump when a rotational speed inputted into the first clutch is higher than a rotational speed inputted from the second transmission path into the hydraulic pump, and interrupt transmission of power from the first transmission path to the hydraulic pump when the rotational speed inputted into the first clutch is lower than or equal to the rotational speed inputted from the second transmission path into the hydraulic pump.

The transmission may include a second clutch in the second transmission path. The second clutch may be operable to transmit power when the rotational speed of the engine is the second rotational speed, and not transmit power when the rotational speed of the engine is other than the second rotational speed.

The hybrid system may further include a mode switch to receive an operation to select one of a plurality of modes, and a controller to switch the rotational speed of the engine to the first rotational speed or to the second rotational speed according to the operation received by the mode switch.

The hybrid system may further include an alternator to generate electricity using power transmitted to the generator.

The transmission may include a third transmission path to transmit power from the engine to the generator. The first transmission path and the second transmission path may be connected to the third transmission path, and the generator and the hydraulic pump are connected in series to the engine.

The third transmission path may include a transmission assembly to transmit power from an output shaft of the engine to an input shaft of the generator, the transmission assembly being connected to the output shaft, and a transmission shaft to transmit power from the output shaft to the first transmission path and the second transmission path, the transmission shaft being connected to the output shaft. The input shaft may be hollow, and the transmission shaft may extend through an interior of the input shaft.

The transmission may include a third transmission path to transmit power from the engine to the generator. The first transmission path and the second transmission path may be connected to the third transmission path, and the generator and the hydraulic pump are connected parallel or substantially parallel to the engine.

The third transmission path may include a transmission assembly to transmit power from an output shaft of the engine to an input shaft of the generator, the transmission assembly being connected to the output shaft, and a transmission shaft to transmit power from the output shaft to the first transmission path and the second transmission path, the transmission shaft being connected to the output shaft. The transmission shaft may extend parallel or substantially parallel to the input shaft.

The transmission may include a third transmission path to transmit power from the engine to the generator. The third transmission path may include a transmission assembly to transmit power from an output shaft of the engine to an input shaft of the generator, the transmission assembly being connected to the output shaft. The transmission assembly may be operable to transmit power received from the output shaft while increasing a rotational speed and transmit the power to the input shaft.

A working machine according to an aspect of an example embodiment of the present invention includes a hybrid system, a machine body, a traveling device to be driven by the electric actuator and to support the machine body such that the machine body is allowed to travel, and a working device to be driven by the hydraulic actuator.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
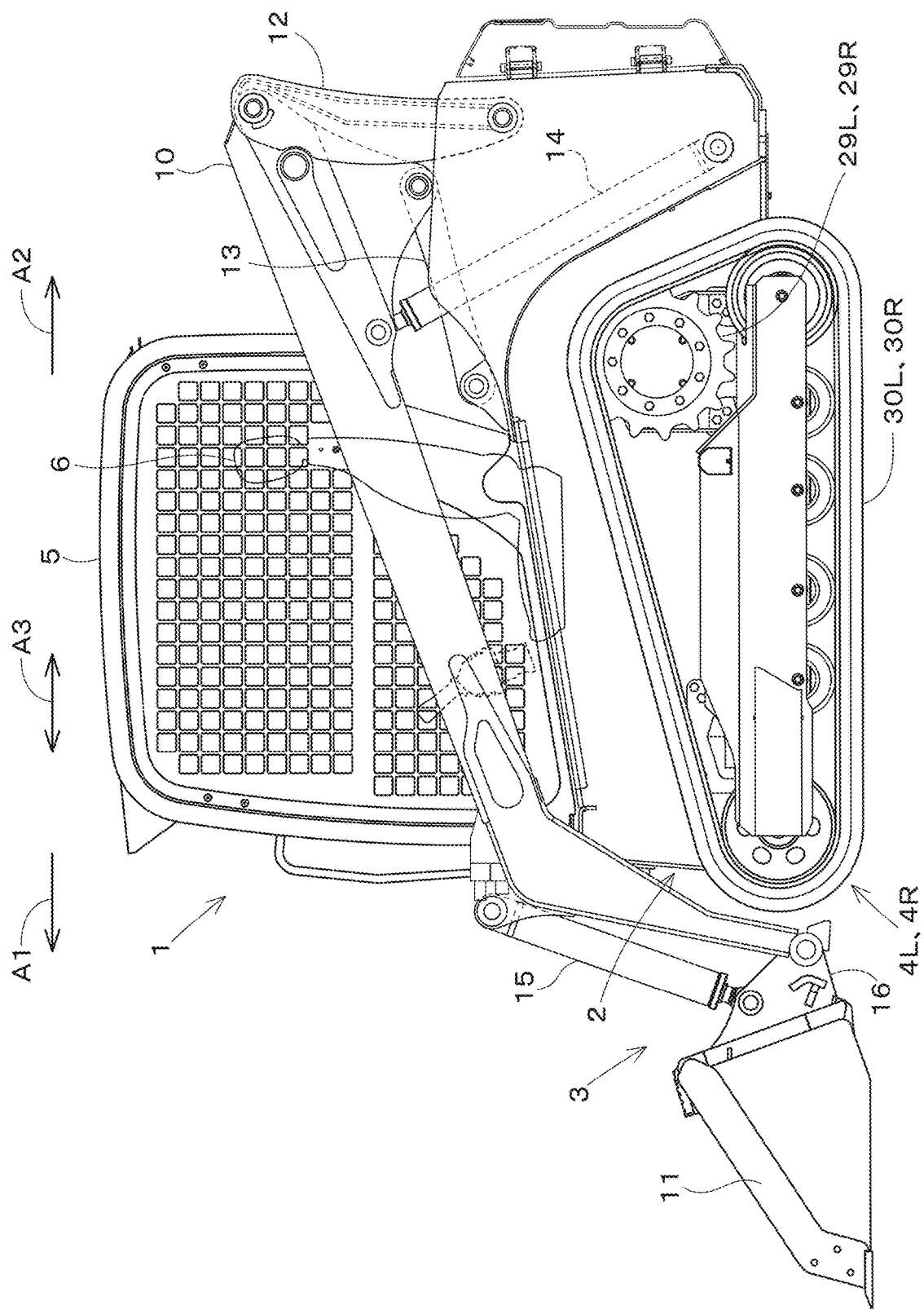
FIG. 1 is a side view of a compact track loader (working machine) including a hybrid system of one or more example embodiments of the present invention.

The example embodiments will now be described with reference to the accompanying drawings, wherein like reference numerals designate corresponding or identical elements throughout the various drawings. The drawings are to be viewed in an orientation in which the reference numerals are viewed correctly.

Hereinafter, example embodiments of a working machine 1 according to the present invention will be described.

First Example Embodiment

FIG. 1 is a side view illustrating the working machine 1 according to an example embodiment of the present invention. FIG. 1 is a side view of a compact track loader (working machine) including a hybrid system of an example embodiment of the present invention. However, the working machines according to example embodiments of the present invention are not limited to a compact track loader, and may be another type of loader working machine such as a skid-steer loader. In addition, the working machine 1 may be a working machine (agricultural machine, construction machine, utility vehicle, or the like) other than the loader working machine. Furthermore, the working machine 1 may be a working machine for towing an engine generator or the like, or may be a vehicle for use other than agricultural or construction use, that is, an automobile.

In the following description, a direction indicated by an arrow A1 in FIG. 1 (forward direction of the working machine 1) is referred to as front, a direction indicated by an arrow A2 (backward direction of the working machine 1) is referred to as rear, and a direction indicated by an arrow A3 is referred to as a front-rear direction. The directions A1 to A3 are illustrated in drawings other than FIG. 1 as appropriate.

In addition, a horizontal direction (right-left direction), which is a direction orthogonal to the front-rear direction A3, will be described as a machine widthwise direction K1 (see FIG. 2). The machine widthwise direction K1 is a widthwise direction of the working machine 1. A direction from a central portion of the widthwise direction of the working machine 1 to the right or left will be referred to as an outward direction in the machine widthwise direction K1 (machine-widthwise outward direction). That is, the machine-widthwise outward direction is a direction away from the center of the widthwise direction of the working machine 1 in the machine widthwise direction K1. A direction opposite to the machine-widthwise outward direction will be referred to as an inward direction in the machine widthwise direction K1 (machine-widthwise inward direction). That is, the machine-widthwise inward direction is a direction toward the center of the widthwise direction of the working machine 1 in the machine widthwise direction K1.

Figure 2:
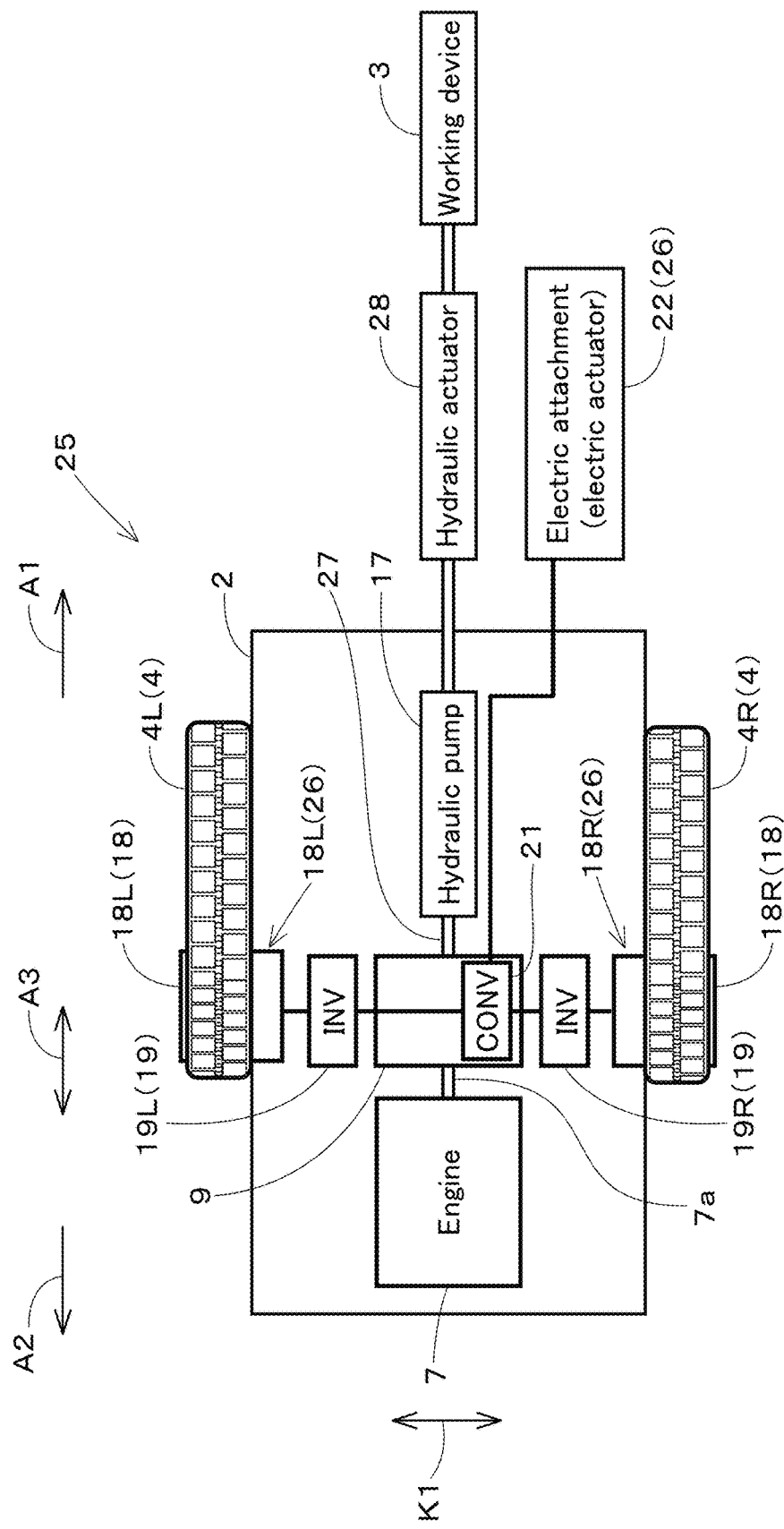
FIG. 2 is an overall block diagram of a driving system of one or more example embodiments of the present invention.

As illustrated in FIGS. 1 and 2, the working machine 1 includes a machine body 2, a working device 3 that is provided on the machine body 2 and performs work, a traveling device 4 that supports the machine body 2 such that the machine body 2 is allowed to travel, and a hybrid system 25. FIG. 2 is an overall block diagram of a driving system (system including the working device 3, the traveling device 4, and the hybrid system 25) of an example embodiment of the present invention. Note that the diagram illustrated in FIG. 2 illustrates the configuration of the driving system, and the positions of the respective elements are not limited to those in the example illustrated in FIG. 2.

The hybrid system 25 uses power (rotational power) generated by an engine 7 to drive the working machine 1 in two driving modes, i.e., a driving mode using electricity and a driving mode using the pressure of hydraulic fluid.

As illustrated in FIG. 2, the hybrid system 25 includes the engine 7, a generator 9, an electric actuator 26, a transmission 27, a hydraulic pump 17, and a hydraulic actuator 28. The engine 7 is provided in the machine body 2. The generator 9 is driven by the engine 7 to generate electricity, and the electric actuator 26 is driven by electricity generated by the generator 9. The transmission 27 transmits power from the engine 7, and the hydraulic pump 17 receives power from the engine 7 through the transmission 27 and delivers hydraulic fluid. Then, the hydraulic actuator 28 is driven by hydraulic fluid delivered from the hydraulic pump 17.

In a first example embodiment, a case where the traveling device 4 is driven by the electric actuator 26 and the working device 3 is driven by the hydraulic actuator 28 will be described as an example. It is only necessary that at least one or more elements of the working device 3 and the traveling device 4 be driven by the electric actuator 26 and the other element(s) be driven by the hydraulic actuator 28. The driving sources for the working device 3 and the traveling device 4 are not limited to that described above.

First, the overall configuration of the working machine 1 will mainly be described below.

As illustrated in FIG. 1, a cabin 5 is mounted on an upper portion of the machine body 2. A rear portion of the cabin 5 is supported by a bracket of the machine body 2 so as to be swingable about a support shaft. A front portion of the cabin 5 is located on a front portion of the machine body 2. An operator's seat 6 is provided in the cabin 5.

As illustrated in FIGS. 1 and 2, the traveling device 4 is a crawler traveling device. The traveling device 4 includes a left traveling device 4L provided on the left of the machine body 2 and a right traveling device 4R provided on the right of the machine body 2. The left traveling device 4L includes a left drive wheel 29L driven by a first motor 18L (which is an electric actuator 26), and a left crawler belt 30L driven by the left drive wheel 29L. In addition, the right traveling device 4R includes a right drive wheel 29R driven by a second motor 18R (which is an electric actuator 26), and a right crawler belt 30R driven by the right drive wheel 29R.

Although the traveling device 4 described above is driven by the different motors 18L and 18R for the left traveling device 4L and the right traveling device 4R, the traveling device 4 may be driven by a common motor as long as the traveling device 4 supports the machine body 2 such that the machine body 2 is allowed to travel. The traveling device 4 is not limited to the crawler traveling device as long as the traveling device 4 can be driven by the motors 18L and 18R to apply a propelling force to the machine body 2.

The working device 3 of the first example embodiment includes boom(s) 10 provided on the machine body 2 so as to be movable up and down, and a working tool 11 attached to the boom(s) 10. As illustrated in FIG. 1, each boom 10 is supported by a lift link 12 and a control link 13. A boom cylinder 14 which is a double-acting hydraulic cylinder is provided between a proximal portion of the boom 10 and a rear lower portion of the machine body 2. The boom 10 is raised and lowered by extending and retracting the boom cylinder 14. The working tool 11 is attached to a distal end portion of the boom(s) 10. More specifically, a mounting bracket 16 is pivotally supported on the distal end portion of the boom(s) 10 so as to be rotatable about a horizontal axis. The working tool 11 is attached to the mounting bracket 16.

A working-tool cylinder 15 which is a double-acting hydraulic cylinder is interposed between the mounting bracket 16 and an intermediate portion on the distal end portion of the boom 10. The extension or retraction of the working-tool cylinder 15 causes the working tool 11 to swing (perform a shoveling or dumping action).

The working tool 11 is attachable to and detachable from the mounting bracket 16. In FIG. 1, a bucket is illustrated as the working tool 11. However, the working tool 11 may be an electric attachment 22 driven by the electric actuator 26 or a hydraulic attachment driven by the hydraulic actuator 28. Specifically, the electric attachment 22 is an attachment that is driven by the electric actuator 26 instead of the hydraulic actuator 28, among existing hydraulic attachments such as a snow rotary used to clear or remove snow, a wood chipper, and the like. The hydraulic attachment is a hydraulic crusher, a hydraulic breaker, or the like.

Figure 3:
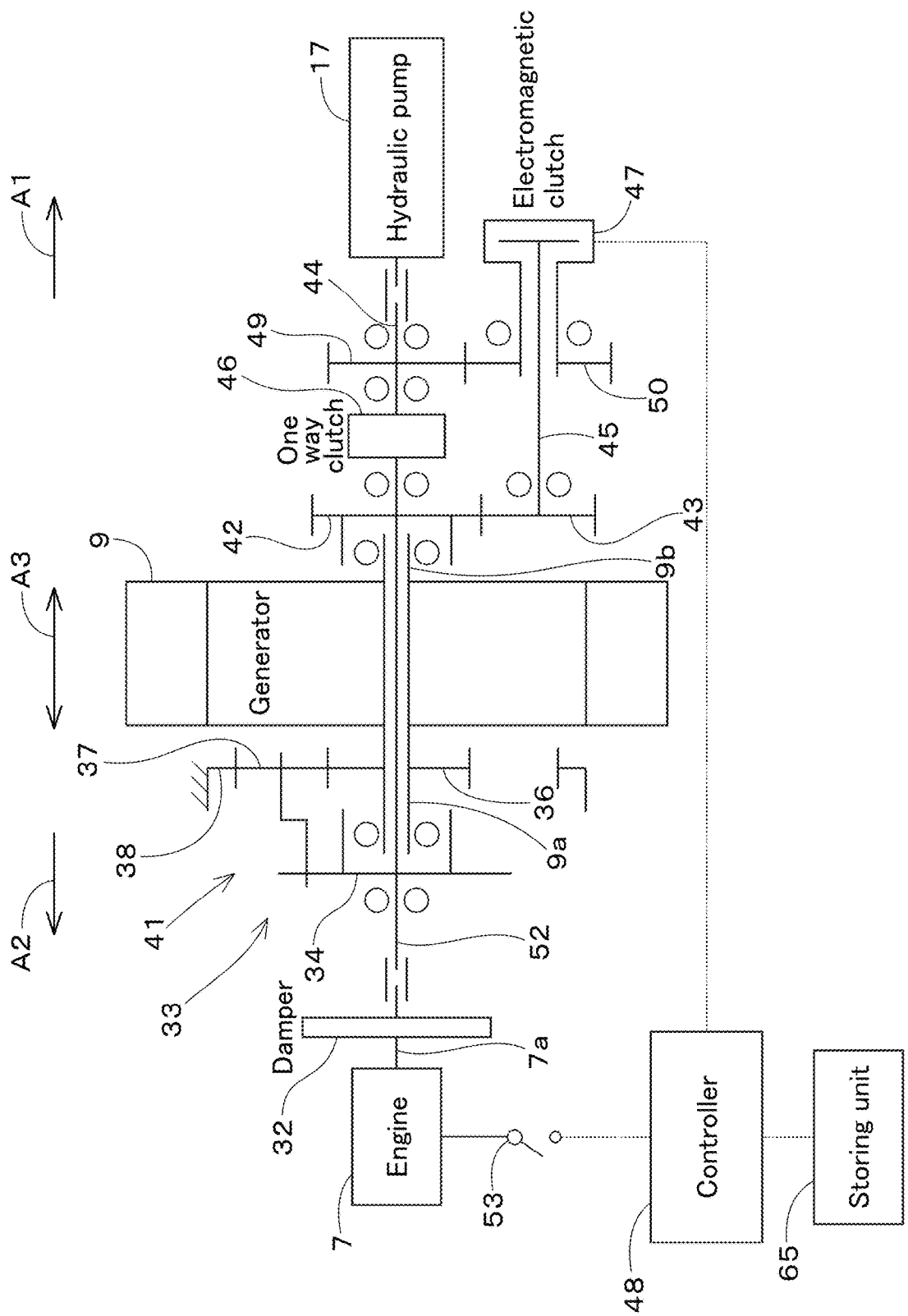
FIG. 3 is a schematic diagram of a hybrid system included in a compact track loader according to a first example embodiment of the present invention.

Next, the hybrid system 25 and the elements of the hybrid system 25 will be described in detail. FIG. 3 is a schematic diagram of a hybrid system included in a compact track loader of the first example embodiment.

The engine 7 is an internal combustion engine such as a diesel engine or a gasoline engine. The engine 7 includes an output shaft 7a. The engine 7 outputs power (rotational power) by rotationally driving the output shaft 7a. As illustrated in FIG. 3, a damper 32 is provided on the output shaft 7a of the engine 7. The damper 32 is a so-called coupling damper using rubber or the like, and absorbs unnecessary vibrations and oscillations applied to the output shaft 7a, thus enabling the engine 7 to output stable power.

The generator 9 receives power transmitted from the output shaft 7a of the engine 7, and generates electricity using the rotational driving force transmitted from the output shaft 7a of the engine 7. The generator 9 includes an input shaft 9a that receives power transmitted from the output shaft 7a of the engine 7. The input shaft 9a is connected to the output shaft 7a by the transmission 27, and receives power from the engine 7 transmitted via the transmission 27.

In the first example embodiment, the generator 9 is attached to the output shaft 7a of the engine 7. Specifically, as illustrated in FIG. 3, the input shaft 9a of the generator 9 is hollow inside. In the input shaft 9a of the generator 9, a transmission shaft 52 (described later) is provided such that the transmission shaft 52 extends through the input shaft 9a in a direction from the front to the rear of the generator 9. The generator 9 of the first example embodiment includes an output shaft 9b that outputs power received at the input shaft 9a. The output shaft 9b extends forward from the generator 9, and is hollow inside, similarly to the input shaft 9a. In the first example embodiment, the input shaft 9a is integral with the output shaft 9b, and the transmission shaft 52 is also provided inside the output shaft 9b of the generator 9 such that the transmission shaft 52 extends through the output shaft 9b in the direction from the front to the rear of the generator 9.

As illustrated in FIGS. 2 and 3, the hydraulic pump 17 receives power from the output shaft 7a of the engine 7, and is driven by the rotational driving force transmitted from the output shaft 7a of the engine 7 to deliver hydraulic fluid stored in a hydraulic tank (not illustrated). The hydraulic pump 17 receives power outputted from the engine 7 and transmitted via the transmission 27. The hydraulic pump 17 is provided in front (downstream) of the generator 9. The hydraulic pump 17 of the first example embodiment is a fixed displacement hydraulic pump. The fixed displacement hydraulic pump is a pump in which the delivery of hydraulic fluid per rotation of a pump drive shaft is constant. The fixed displacement hydraulic pump 17 is, for example, a gear pump.

Each motor 18 is, for example, a permanent magnet-embedded, alternating current synchronous motor, a wound field synchronous motor, or the like. In the present example embodiment, the motors 18 include the first motor 18L that drives the drive wheel 29L of the left traveling device 4L and the second motor 18R that drives the drive wheel 29R of the right traveling device 4R. As illustrated in FIG. 2, a direct current-alternating current conversion inverter 19 is provided between the generator 9 and each motor 18. The inverter 19 actuates the alternating current synchronous motor 18 using direct current electricity obtained by an alternating current-direct current conversion converter 21 converting alternating current electricity generated by the generator 9. Although not illustrated, a battery for storing the generated or converted electricity may be provided on a wire between the generator 9 and the motor 18, in particular, between the converter 21 and the inverter 19.

The number of the inverters 19 described above may be one or two or more corresponding to the respective motors 18. In the present example embodiment, the inverters 19 include a first inverter 19L corresponding to the first motor 18L and a second inverter 19R corresponding to the second motor 18R. The first inverter 19L and the second inverter 19R convert the direct current electricity generated by the converter 21 into the alternating current electricity. The alternating current electricity converted by the first inverter 19L is supplied to the first motor 18L, and the first motor 18L is driven by the supplied alternating current electricity. The alternating current electricity converted by the second inverter 19R is supplied to the second motor 18R, and the second motor 18R is driven by the supplied alternating current electricity.

The converter 21 converts alternating current electricity generated by the generator 9 into direct current electricity. The converter 21 supplies the converted alternating current electricity to the electric actuator 26 to drive the electric actuator 26.

As illustrated in FIG. 3, the hybrid system 25 includes a controller 48 and a storing unit (memory and/or storage) 65. The controller 48 includes electric/electronic circuit(s), program(s) stored in a central processing unit (CPU) or the like, and/or the like, and controls various elements included in the working machine 1. The storing unit 65 is a non-volatile memory and/or the like, and stores various kinds of information and/or the like related to the control by the controller 48.

For example, the controller 48 can be switched to a plurality of modes (operation modes), and can control the rotational speed of the engine 7 in accordance with the switched operation mode. Specifically, as illustrated in FIG. 3, a mode switch 53 is connected to the controller 48. The mode switch 53 is used to select one of the operation modes, and is suitably provided on the operator's seat 6 of the working machine 1, a control application in a terminal communicably connected to the controller 48, or the like.

A case where the mode switch 53 is provided in the vicinity of the operator's seat 6 will be described as an example. A changeover switch such as a switching lever or a switching knob is used as the mode switch 53. That is, the mode switch 53 is provided with contacts corresponding to the respective operation modes, and the operation modes can be switched by causing the changeover switch to switch between the contacts.

The mode switch 53 can output a signal corresponding to a selected operation mode (contact) to the controller 48. With this, the controller 48 acquires the rotational speed corresponding to the operation mode from the storing unit 65 in accordance with the signal corresponding to the operation mode inputted from the mode switch 53, and controls the rotational speed of the engine 7 to be constant.

In the first example embodiment, the controller 48 can switch between a first operation mode (high-power operation mode) and a second operation mode (eco-operation mode) as the plurality of operation modes. The first operation mode is a mode in which the rotational speed of the engine 7 is controlled to a first rotational speed R1, and the second operation mode is a mode in which the rotational speed of the engine 7 is controlled to a second rotational speed R2. The second rotational speed R2 is lower than the first rotational speed R1 (R2<R1). In the first example embodiment, the first rotational speed R1 is 2000 rpm, and the second rotational speed R2 is 1600 rpm, for example.

The numerical values of the first rotational speed R1 and the second rotational speed R2 are not limited to the above values as long as the second rotational speed R2 is lower than the first rotational speed R1.

Although the case where the controller 48 can switch between the first operation mode and the second operation mode as the plurality of operation modes is described as an example in the first example embodiment, the controller 48 may switch to an operation mode different from the first operation mode and the second operation mode.

As illustrated in FIG. 3, the transmission 27 is a mechanism to transmit power from the engine 7 to the hydraulic pump 17, and includes a plurality of power transmission paths to transmit power from the engine 7 to the hydraulic pump 17. The transmission 27 includes a plurality of transmission paths that can be switched (selected) in accordance with the rotational speed of the engine 7.

Figure 4:
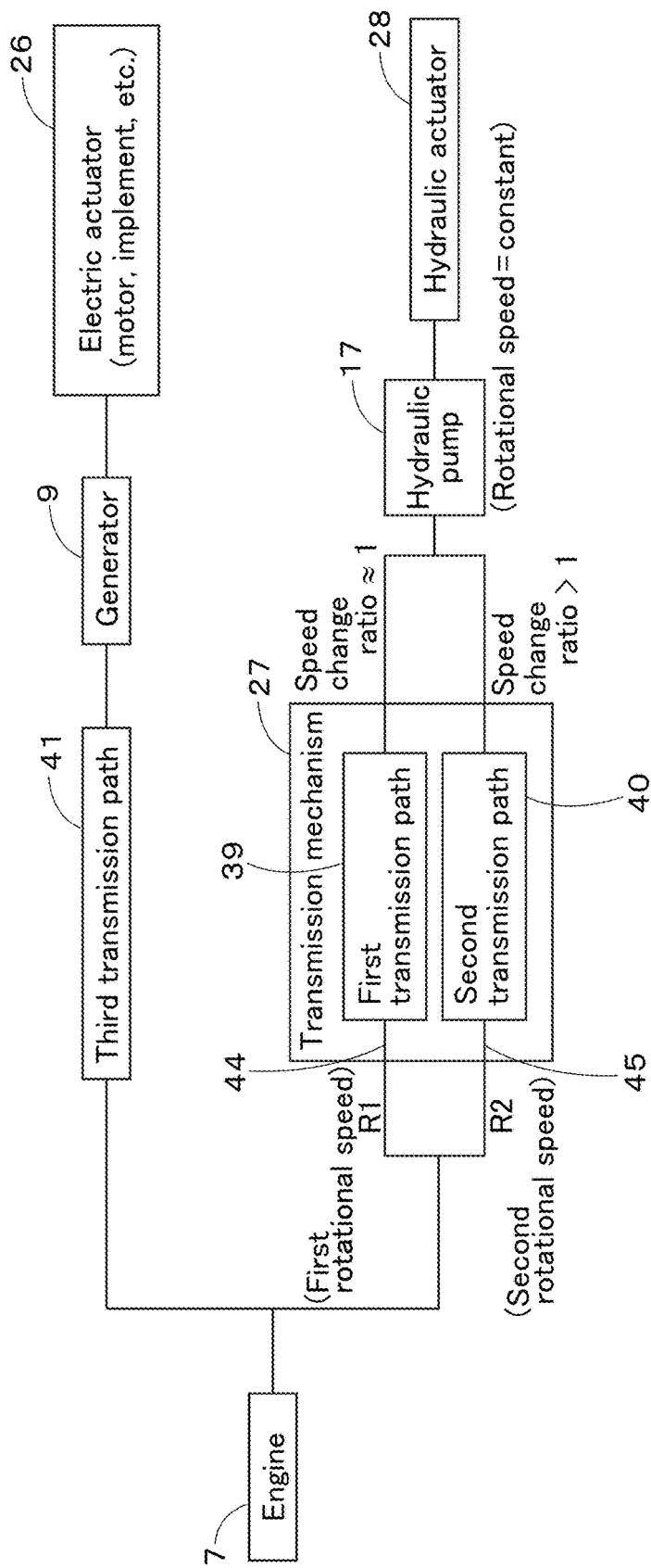
FIG. 4 is a block diagram of the hybrid system included in the compact track loader according to the first example embodiment of the present invention.

As illustrated in FIG. 4, the transmission 27 includes a first shaft 44, a first transmission path 39, a second transmission path 40, and a third transmission path 41. The first shaft 44 is a shaft that transmits power to the hydraulic pump 17. The first shaft 44 extends in the front-rear direction.

The first transmission path 39 and the second transmission path 40 transmit power from the engine 7 to the hydraulic pump 17 via the first shaft 44 and a second shaft 45, respectively, and the third transmission path 41 transmits power from the engine 7 to the generator 9.

The transmission 27 can switch between the first transmission path 39 and the second transmission path 40 in accordance with the rotational speed of the engine 7. Specifically, when the rotational speed of the engine 7 is the first rotational speed R1, the first transmission path 39 transmits power from the engine 7 to the hydraulic pump 17. On the other hand, when the rotational speed of the engine 7 is the second rotational speed R2, the second transmission path 40 transmits power from the engine 7 to the hydraulic pump 17 at a speed change ratio at which a rotational speed is increased to a greater degree than at a speed change ratio of the first transmission path 39.

That is, when the rotational speed of the engine 7 is the first rotational speed R1, in other words, when the controller 48 is in the first operation mode, power is transmitted from the engine 7 to the generator 9 and the hydraulic pump 17 via the third transmission path 41 and the first transmission path 39. On the other hand, when the rotational speed of the engine 7 is the second rotational speed R2, in other words, when the controller 48 is in the second operation mode, power is transmitted from the engine 7 to the generator 9 and the hydraulic pump 17 via the third transmission path 41 and the second transmission path 40.

Hereinafter, for convenience of description, the configurations of the third transmission path 41, the first transmission path 39, and the second transmission path 40 will be described in detail in this order.

As illustrated in FIG. 3, the third transmission path 41 includes the transmission shaft 52 and a transmission assembly 33. The transmission shaft 52 is connected to the output shaft 7*a* of the engine 7, and transmits power from the output shaft 7*a* to the first transmission path 39 and the second transmission path 40. Specifically, in the first example embodiment, the transmission shaft 52 is provided in front (downstream) of the output shaft 7*a* of the engine 7. A rear end (upstream end) of the transmission shaft 52 is connected to the output shaft 7*a* of the engine 7. Therefore, the transmission shaft 52 is rotationally driven together with the output shaft 7*a* as the output shaft 7*a* is rotationally driven. A front end (downstream end) portion of the transmission shaft 52 extends through the interior of the input shaft 9*a* and the output shaft 9*b* of the generator 9 and extends farther forward than a front end of the output shaft 9*b*. The first transmission path 39 is connected to the front end of the transmission shaft 52.

The transmission assembly 33 is connected to the transmission shaft 52, and transmits power from the output shaft 7*a* to the input shaft 9*a* of the generator 9 via the transmission shaft 52. The transmission assembly 33 of the first example embodiment defines a planetary gear mechanism, and includes a carrier plate 34, a sun gear 36, a carrier gear 37, and an internal gear 38.

As illustrated in FIG. 3, the carrier plate 34 is attached to a rear portion (upstream end) of the transmission shaft 52, and rotates together with the transmission shaft 52. The carrier gear 37 is provided on an outer peripheral portion of the carrier plate 34 to be rotatable about an axis extending in the front-rear direction. Note that the carrier plate 34 may be attached to the output shaft 7*a* instead of the transmission shaft 52 as long as the carrier plate 34 can at least rotate together with the output shaft 7*a*. In such a case, the carrier plate 34 is attached to the output shaft 7*a* in front of the damper 32.

The sun gear 36 is provided in front of the carrier plate 34 and attached to the input shaft 9*a* of the generator 9 to be rotatable together with the input shaft 9*a*.

The carrier gear 37 is located farther from the axis of the transmission shaft 52 than the sun gear 36 is. The carrier gear 37 meshes with the sun gear 36, and is rotatable together with the sun gear 36.

The internal gear 38 meshes with the carrier gear 37, and is located farther from the axis of the transmission shaft 52 than the carrier gear 37 is. The internal gear 38 is fixed so as not to be rotatable.

Therefore, power from the transmission shaft 52 is transmitted to the carrier gear 37 via the carrier plate 34. The carrier gear 37 rolls along the inner periphery (internal teeth) of the fixed internal gear 38 along a circumferential path around the axis of the input shaft 9*a*. When the carrier gear 37 rolls along the circumferential path, the sun gear 36 meshing with the carrier gear 37 rotates in a direction opposite to the rolling direction of the carrier gear 37. Since the sun gear 36 is attached to the input shaft 9*a* to be rotatable together with the input shaft 9*a*, the sun gear 36 rotates about the axis of the input shaft 9*a*. Therefore, with the use of the transmission assembly 33 described above, the transmission assembly 33 is connected to the output shaft 7*a* of the engine 7 and transmits power from the output shaft 7*a* to the input shaft 9*a* of the generator 9, so that the generator 9 can generate electricity.

Note that, for the third transmission path 41 described above, a speed change ratio T3 for cases where power is transmitted via the third transmission path 41 is set to "3.0 times", for example. By setting the speed change ratio T3 for cases where power is transmitted via the third transmission path 41 to a large value as such, the rotational speed of the generator 9 can be made higher than the rotational speed of the hydraulic pump 17, so that a sufficient amount of electricity can be generated even if the generator 9 is small, and the size of the generator can be reduced.

The first transmission path 39 includes a first clutch 46 and the first shaft 44. The first clutch 46 of the first example embodiment is a so-called one way clutch. The first clutch 46 can switch between ON and OFF states (engagement and disengagement) of power transmission between an upstream portion and a downstream portion in accordance with which of the rotational speed of the rear (upstream) of the first clutch 46 and the rotational speed of the front (downstream) of the first clutch 46 is higher. The transmission shaft 52 is connected to the rear (upstream) of the first clutch 46. The first shaft 44 is connected to the front (downstream) of the first clutch 46.

The transmission of power by the first transmission path 39 in the example illustrated in the first example embodiment will be described. When the rotational speed of the transmission shaft 52 connected to the rear (upstream) of the first clutch 46 is higher than or equal to the rotational speed of the first shaft 44 connected to the front (downstream) of the first clutch 46 (when the rotational speed of the engine 7 is constant or increased), the first clutch 46 enters the ON state and transmits power. When the rotational speed of the transmission shaft 52 is lower than the rotational speed of the first shaft 44 (for example, when the rotational speed of the engine 7 decreases), the first clutch 46 enters the OFF state and interrupts the transmission of power.

For the first transmission path 39, a speed change ratio (first speed change ratio T1) that is a ratio of the rotational speed outputted from the first transmission path 39 to the rotational speed inputted into the first transmission path 39 is set (defined). In the first example embodiment, the first speed change ratio T1 is defined as "1", for example, and the rotational speed is not changed (not increased or decreased) in the first transmission path 39. Note that the first speed change ratio T1 described above is set using a transmission assembly such as gear(s) provided in the first transmission path 39.

In the transmission 27 of the first example embodiment, the first speed change ratio T1 is "1", and in addition, the generator 9 and the hydraulic pump 17 are connected in series to the engine 7 by the first transmission path 39. The configuration in which the generator 9 and the hydraulic pump 17 are connected in series as described above is a simple structure in which power can be transmitted without using many gears or the like, and is advantageous in that power from the engine 7 can be directly transmitted to the hydraulic pump 17.

Note that the first speed change ratio T1 does not need to be "1". For example, when the first speed change ratio T1 is larger than "1", the hydraulic pump 17 can be actuated at high speed, and flow rate can be increased.

The second transmission path 40 is provided separately from the first transmission path 39, as a path to transmit power to the hydraulic pump 17. The second transmission path 40 of the first example embodiment is provided between the first shaft 44 rearward (upstream) of the first clutch 46 and the first shaft 44 in front (downstream) of the first clutch 46. The second transmission path 40 can be used such that the second transmission path 40 transmits power to the hydraulic pump 17 when the transmission of power from the first transmission path 39 to the hydraulic pump 17 (power transmission via the first clutch 46) is interrupted, and the second transmission path 40 interrupts the power transmission to the hydraulic pump 17 when power from the first transmission path 39 is transmitted.

The second transmission path 40 includes a second gear 42, a third gear 43, the second shaft 45, a second clutch 47, a fourth gear 49, and a fifth gear 50. The second gear 42 is attached to the transmission shaft 52 to be rotatable together with the transmission shaft 52. Specifically, the second gear 42 is attached to the front (downstream) of the transmission shaft 52. Thus, a portion of power from the engine 7 inputted into the transmission shaft 52 is distributed to the first transmission path 39 and the second transmission path 40 by the second gear 42.

The third gear 43 meshes with the second gear 42, and power from the second gear 42 is transmitted to the third gear 43.

The second shaft 45 extends in the front-rear direction, and is provided in parallel or substantially in parallel to the first shaft 44 (in other words, both are provided in parallel or substantially in parallel along the front-rear direction). The third gear 43 is attached to the second shaft 45. The third gear 43 is rotatable together with the second shaft 45. The third gear 43 is attached to the rear (upstream) of the second shaft 45. Thus, the second shaft 45 is rotated by power transmitted from the transmission shaft 52 via the second gear 42 and the third gear 43. The upstream portion of the second clutch 47 is connected to the front (downstream) portion of the second shaft 45.

The second clutch 47 can switch between ON and OFF states (engagement and disengagement) of power transmission between an upstream portion and a downstream portion. Specifically, when operation is performed while switching the operation mode between the first operation mode and the second operation mode, the second clutch 47 is in the OFF state when the first clutch 46 is in the ON state. When the transmission 27 is stopped, for example, both the first clutch 46 and the second clutch 47 may be in the OFF state. The second clutch 47 is, for example, an electromagnetic clutch that can be switched between ON/OFF based on a command from the controller 48. The ON/OFF of the second clutch 47 is controlled using the controller 48.

The controller 48 is an electronic device configured or programmed to detect an ON/OFF command for the second clutch 47 and output the detection result (ON or OFF state). The controller 48 outputs an ON/OFF control signal to the second clutch 47 according to the signal corresponding to the operation mode of the engine 7 inputted from the mode switch 53, and permits or prohibits the power transmission via the second transmission path 40. Specifically, the controller 48 brings the second clutch 47 into the OFF state (interrupts power transmission) in the first operation mode, and brings the second clutch 47 into the ON state in the second operation mode.

More specifically, when transitioning from the second operation mode to the first operation mode, the controller 48 increases the rotational speed of the engine 7 from the second rotational speed R2 (1600 rpm) to the first rotational speed R1 (2000 rpm) (speed increase control), and brings the second clutch 47 into the OFF state before performing the speed increase control. When transitioning from the first operation mode to the second operation mode, the controller 48 reduces the rotational speed of the engine 7 from the first rotational speed R1 (2000 rpm) to the second rotational speed R2 (1600 rpm) (speed decrease control), and brings the second clutch 47 into the ON state after performing the speed decrease control.

In other words, the controller 48 switches the second clutch 47 to the ON state at least when the rotational speed of the engine 7 is controlled to the second rotational speed R2, and switches the second clutch 47 to the OFF state when the rotational speed of the engine 7 is controlled at a rotational speed higher than the second rotational speed R2.

Note that the switching of the second clutch 47 by the controller 48 is not limited to the above-described control. For example, the controller 48 may be configured or programmed to switch the second clutch 47 to the ON state when the rotational speed of the engine 7 is controlled to be lower than or equal to the second rotational speed R2.

The fourth gear 49 is attached downstream of the second clutch 47 so as to be rotatable together.

The fourth gear 49 is attached to the front (downstream) of the second clutch 47, and power from the second clutch 47 is transmitted to the fourth gear 49. The fourth gear 49 meshes with the fifth gear 50, and transmits power from the second clutch 47 to the fifth gear 50.

The fifth gear 50 is attached to the first shaft 44 to be rotatable together with the first shaft 44. Specifically, the fifth gear 50 is attached to the front (downstream) of the first shaft 44.

For the second transmission path 40, a speed change ratio (second speed change ratio T2) (which is a ratio of the rotational speed outputted from the second transmission path 40 to the rotational speed inputted into the second transmission path 40) is set (defined). The second speed change ratio T2 is defined based on the first speed change ratio T1 of the first transmission path 39, the first rotational speed R1 of the first operation mode, and the second rotational speed R2 of the second operation mode. Specifically, the speed change ratios of the first transmission path 39 and the second transmission path 40 are such that the rotational speed inputted from the first transmission path 39 into the hydraulic pump 17 when the rotational speed of the engine 7 is the first rotational speed R1 is equal or substantially equal to the rotational speed inputted from the second transmission path 40 into the hydraulic pump 17 when the rotational speed of the engine 7 is the second rotational speed R2. Since the first rotational speed R1 is higher than the second rotational speed R2, the rotational speed inputted into the hydraulic pump 17 when power is inputted from the engine 7 into the hydraulic pump 17 via the first transmission path 39 is equal to the rotational speed inputted into the hydraulic pump 17 when power is inputted from the engine 7 into the hydraulic pump 17 via the second transmission path 40. This is because the speed change ratio in a case of passing through the second transmission path 40 is larger than the speed change ratio in a case of passing through the first transmission path 39 (rotational speed is increased to a greater degree in the second transmission path 40 than in the first transmission path 39).

That is, the product of the first speed change ratio T1 and the first rotational speed R1 needs to be equal to the product of the second speed change ratio T2 and the second rotational speed R2. Therefore, the second speed change ratio T2 can be set (defined) to a value obtained by dividing the product of the first speed change ratio T1 and the first rotational speed R1 by the second rotational speed R2.

That is, the relationship between the first speed change ratio T1 and the second speed change ratio T2 described above can be expressed by the following equation.

$$T2 = T1 \times R1/R2$$

It is noted here that, in the first example embodiment, since the first rotational speed R1 in the first operation mode is 2000 rpm, the second rotational speed R2 in the second operation mode is 1600 rpm, and the first speed change ratio T1 is "1", the second speed change ratio T2 of the second transmission path 40 is 1.0×2000/1600=1.25, for example.

That is, by setting the second speed change ratio T2 of the second transmission path 40 to 1.25, power is inputted into the hydraulic pump 17 at the first speed change ratio T1=1.0 via the first transmission path 39 in the first operation mode in which the controller 48 controls the rotational speed of the engine 7 to 2000 rpm, whereas, in the second operation mode in which the controller 48 controls the rotational speed of the engine 7 to 1600 rpm, power is inputted into the hydraulic pump 17 via the second transmission path 40 at the second speed change ratio T2=1.25. The rotational speed inputted into the hydraulic pump 17 via the first transmission path 39 is 2000 rpm×1.0=2000 rpm. The rotational speed inputted into the hydraulic pump 17 via the second transmission path 40 is 1600 rpm×1.25=2000 rpm. That is, the hydraulic pump 17 can continue to be driven at a constant rotational speed (for example, 2000 rpm in the first example embodiment) regardless of which operation mode is selected.

Note that the second speed change ratio T2 described above is set using a transmission assembly such as gear(s) provided in the second transmission path 40. The second speed change ratio T2 is set by the second gear 42, the third gear 43, the fourth gear 49, and the fifth gear 50. That is, the second speed change ratio T2 is a speed change ratio of a path passing through the second gear 42, the third gear 43, the fourth gear 49, and the fifth gear 50. That is, in the first example embodiment, the second speed change ratio T2 is defined based on (i) the speed change ratio in a case where the second gear 42 and the third gear 43 are used in combination and (ii) the speed change ratio in a case where the fourth gear 49 and the fifth gear 50 are used in combination. The number of teeth and the like of each gear may be set such that the second speed change ratio T2 satisfies the relationship with the first speed change ratio T1 expressed by the above equation.

In the hybrid system 25 of the first example embodiment, since the one way clutch is used as the first clutch 46, the controller 48 controls only ON/OFF of the second clutch 47. However, a clutch other than the one way clutch, for example, an electromagnetic clutch similar to the second clutch 47 may be used as the first clutch 46. When the electromagnetic clutch is also used as the first clutch 46 in this manner, the controller 48 may be configured or programmed to individually output the ON/OFF command to each of the first and second clutches 46 and 47.

The following description discusses a procedure to perform electricity generation and hydraulic pressure control using the hybrid system 25 of the first example embodiment described above, and a flow of power transmission from the engine 7 to the generator 9 and the hydraulic pump 17 by the transmission 27 when the operation mode is switched.

First, a case where the engine 7 is operated in the first operation mode will be described. When the controller 48 is in the first operation mode, the mode switch 53 has been switched to the contact indicating the first operation mode by an operator, and the controller 48 acquires the first rotational speed R1 from the storing unit 65 based on the signal outputted from the mode switch 53 and controls the engine 7 to be driven at the first rotational speed R1. In the first operation mode, the controller 48 also switches the second clutch 47 to the OFF state.

In the first operation mode, power that is outputted from the engine 7 and that causes rotation at the first rotational speed R1 is transmitted forward (downstream) from the output shaft 7a of the engine 7 via the damper 32, and rotationally drives the transmission shaft 52. When the transmission shaft 52 is rotationally driven, a portion of power from the engine 7 rotationally driven at the first rotational speed R1 is inputted from the transmission shaft 52 into the input shaft 9a of the generator 9 via the transmission assembly 33.

With this, the generator 9 generates electricity using power inputted into the input shaft 9a, and the generated electricity is supplied to the electric actuator 26. In the first example embodiment, alternating current electricity generated by the generator 9 is converted into direct current electricity by the alternating current-direct current conversion converter 21 and then converted into alternating current electricity by the first inverter 19L and the second inverter 19R, and the motors 18L and 18R can be driven by being supplied with the converted alternating current electricity. Therefore, when the motors 18L and 18R are driven, the traveling devices 4L and 4R (crawler traveling devices in this example embodiment) are driven. It follows that the compact track loader, which is the working machine 1, can be caused to travel.

The alternating current electricity generated by the generator 9 may be converted into direct current electricity by the converter 21, and the electric attachment 22 may be driven by the converted direct current electricity.

The portion of the power causing rotation at the first rotational speed R1 of the engine 7 that is other than the portion transmitted to the transmission assembly 33 is transmitted to the first transmission path 39 and the second transmission path 40 via the transmission shaft 52.

Specifically, the transmission shaft 52 transmits power to the first clutch 46. The first clutch 46 is rotationally driven by power transmitted from the transmission shaft 52. It is noted here that the controller 48 switches the second clutch 47 to the OFF state, and power from the second transmission path 40 to the first shaft 44 in front of (downstream) the first clutch 46 is interrupted. With this, since the rotational speed of the transmission shaft 52 rearward (upstream) of the first clutch 46 is equal to the rotational speed of the first shaft 44 in front of (downstream) the first clutch 46, the first clutch 46 enters the ON state and transmits power.

Therefore, power that is outputted from the output shaft 7a of the engine 7 is transmitted to the hydraulic pump 17 via the transmission shaft 52 and the first transmission path 39, and the hydraulic pump 17 is driven by the power to deliver hydraulic fluid.

Next, a case where the controller 48 transitions from the first operation mode to the second operation mode (hereinafter, for convenience of description, a period during which the controller 48 transitions from the first operation mode to the second operation mode will be referred to as a first transition period) will be described. Specifically, the operator operates the mode switch 53 to switch the mode switch 53 from the contact indicating the first operation mode to the contact indicating the second operation mode. The controller 48 acquires the second rotational speed R2 from the storing unit 65 based on the signal outputted from the mode switch 53, and performs the speed decrease control such that the engine 7 is driven at the second rotational speed R2 instead of the first rotational speed R1. In the first transition period, the controller 48 also maintains the second clutch 47 in the OFF state until the rotational speed of the engine 7 changes from the first rotational speed R1 to the second rotational speed R2.

In the first transition period, a portion of the power of the engine 7 is inputted from the transmission shaft 52 into the input shaft 9a of the generator 9 via the transmission assembly 33, as in the first operation mode.

With this, the generator 9 generates electricity using power inputted into the input shaft 9a, and the generated electricity is transmitted to the electric actuator 26.

In the first transition period, the portion of power from the engine 7 that is other than the portion transmitted to the transmission assembly 33 is transmitted to the first transmission path 39 and the second transmission path 40 via the transmission shaft 52.

It is noted here that, also in the first transition period, the controller 48 switches the second clutch 47 to the OFF state, and power from the second transmission path 40 to the first shaft 44 in front of (downstream) the first clutch 46 is interrupted. On the other hand, in the first transition period, the rotational speed of the first shaft 44 in front of (downstream) the first clutch 46 is higher than the rotational speed of the transmission shaft 52 rearward (upstream) of the first clutch 46 due to the inertial drive of the hydraulic pump 17. Thus, the first clutch 46 enters the OFF state and interrupts the transmission of power transmitted from the transmission shaft 52. Note that, in the first transition period, when the rotational speed of the transmission shaft 52 rearward (upstream) of the first clutch 46 is equal to the rotational speed of the first shaft 44 in front of (downstream) the first clutch 46, the first clutch 46 enters the ON state and transmits power.

On the other hand, a case where the controller 48 transitions from the second operation mode to the first operation mode (hereinafter, for convenience of description, a period during which the controller 48 transitions from the second operation mode to the first operation mode will be referred to as a second transition period) will be described.

The operator operates the mode switch 53 to switch the mode switch 53 from the contact indicating the second operation mode to the contact indicating the first operation mode. The controller 48 acquires the first rotational speed R1 from the storing unit 65 based on the signal outputted from the mode switch 53, and performs the speed increase control such that the engine 7 is driven at the first rotational speed R1 instead of the second rotational speed R2. In the second transition period, unlike in the first transition period, the controller 48 also changes the first clutch 46 to the ON state when the rotational speed of the engine 7 is increased even slightly from the second rotational speed R2 toward the first rotational speed R1.

In the second transition period, a portion of power from the engine 7 is inputted from the transmission shaft 52 into the input shaft 9a of the generator 9 via the transmission assembly 33, similarly to the second operation mode.

Thus, the generator 9 generates electricity using power inputted into the input shaft 9a, and the generated electricity is transmitted to the electric actuator 26.

In the second transition period, the portion of power from the engine 7 that is other than the portion transmitted to the transmission assembly 33 is transmitted to the first transmission path 39 and the second transmission path 40 via the transmission shaft 52.

It is noted here that, upon the transition to the second transition period, the controller 48 switches the second clutch 47 to the OFF state, and power from the second transmission path 40 to the first shaft 44 in front (downstream) of the first clutch 46 is interrupted. On the other hand, in the second transition period, since the rotational speed of the engine 7 is increased from the second rotational speed R2 to the first rotational speed R1, the rotational speed of the transmission shaft 52 rearward (upstream) of the first clutch 46 is higher than the rotational speed of the first shaft 44 in front of (downstream) the first clutch 46. With this, the first clutch 46 enters the ON state and receives power transmitted from the transmission shaft 52. Note that, in the second transition period, when the rotational speed of the transmission shaft 52 rearward (upstream) of the first clutch 46 is equal to the rotational speed of the first shaft 44 in front of (downstream) the first clutch 46, the first clutch 46 immediately enters the ON state and transmits the power. Therefore, the first clutch 46 enters the ON state substantially at the same time as the transition to the second transition period.

In the hybrid system 25 of the first example embodiment, the operation state (operation mode) of the engine 7 can be switched between the first operation mode in which the engine 7 is driven at the first rotational speed R1 and can generate relatively large power and the second operation mode in which the engine 7 is driven at the second rotational speed R2 and can more efficiently generate power while reducing fuel consumption. Even when the operation mode of the engine 7 is switched, the hydraulic pump 17 can be driven at a constant rotational speed regardless of the switching of the operation mode, by switching between (selecting one of) the first transmission path 39 and the second transmission path 40 before and/or after the switching of the operation mode.

Therefore, in the hybrid system 25 of the first example embodiment, unlike in existing hybrid systems, when a high-power operation is switched to an eco-operation, the rotational speed for driving the hydraulic pump 17 does not become insufficient and the flow rate of hydraulic fluid delivered by the hydraulic pump 17 does not decrease more than necessary, and the working machine 1 can stably drive the hydraulic actuator 28.

Second Example Embodiment

Next, a hybrid system 25 of a second example embodiment will be described.

Figure 5:
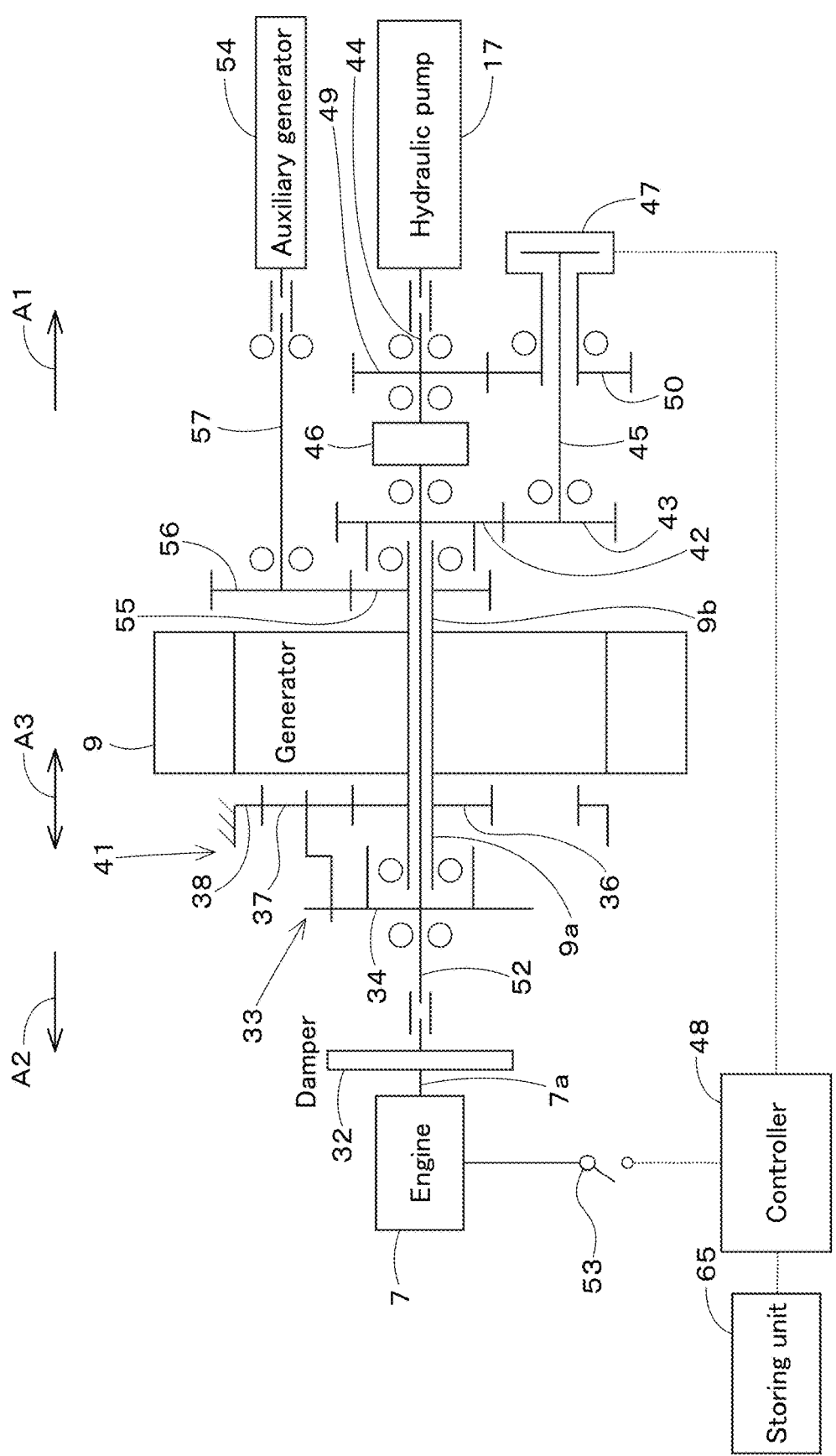
FIG. 5 is a schematic diagram of a hybrid system included in a compact track loader according to a second example embodiment of the present invention.
Figure 7:
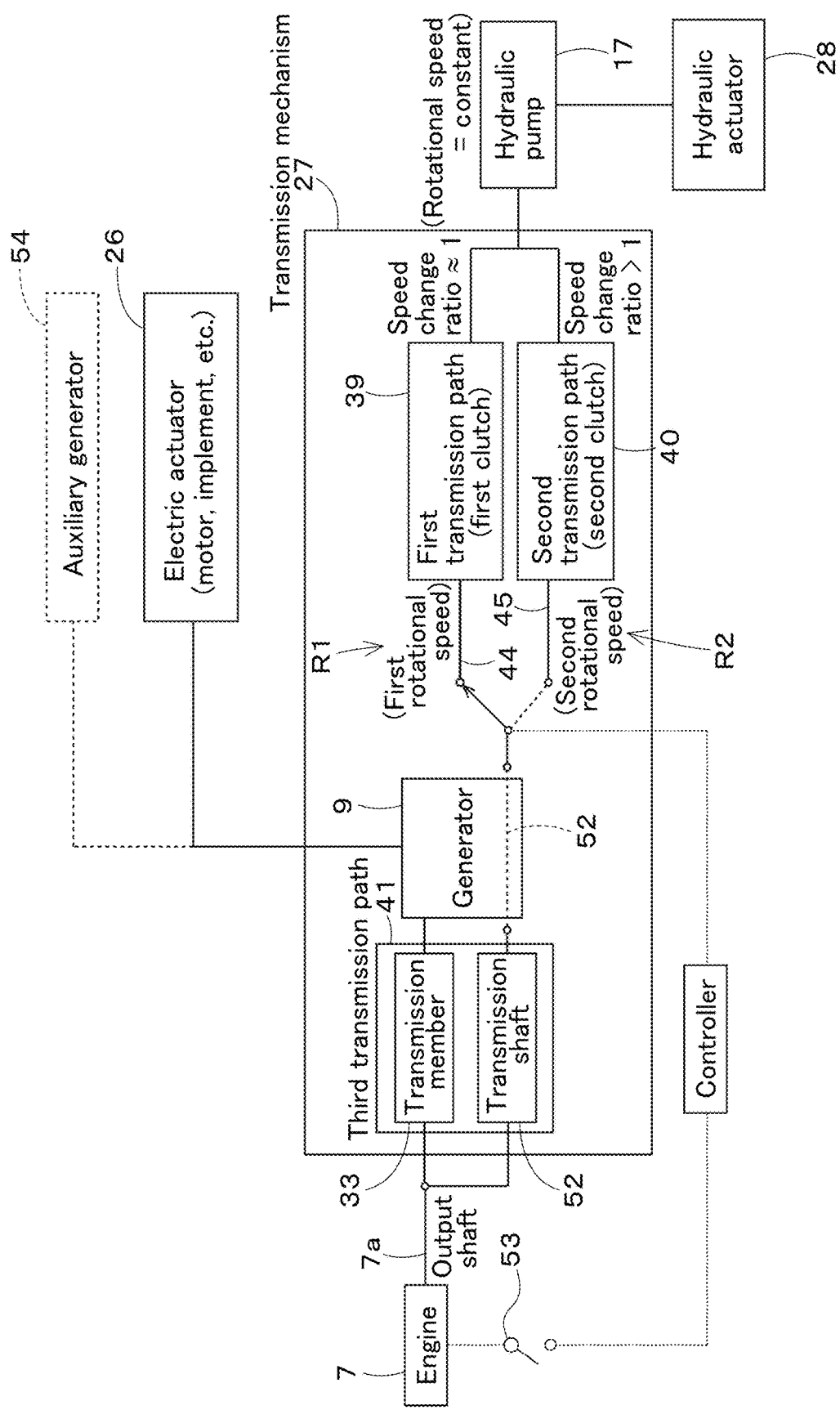
FIG. 7 is a block diagram of the hybrid system included in the compact track loader according to the second example embodiment of the present invention.

As illustrated in FIGS. 5 and 7, the hybrid system 25 of the second example embodiment includes an auxiliary generator 54 in addition to the generator 9.

The auxiliary generator 54 is a small generator generally called an alternator. There are two reasons for providing the auxiliary generator 54.

The first reason is the difference in voltage between the generator 9 and the auxiliary generator 54. Specifically, while the generator 9 generates high-voltage electricity for driving the traveling device 4, electricity generated by the auxiliary generator 54 has low voltage (12, 24, 48 V) lower than or equal to 60 V, for example. Such low-voltage electricity is suitable for driving electrical devices (a radiator, an air conditioner, and the like) of the working machine 1 other than those for driving the traveling device 4 or for driving the working device 3.

The second reason is the generation of larger output electricity than existing alternators. That is, electricity generated by the auxiliary generator 54 of one or more example embodiments of the present invention is larger than electricity (output) generated by the existing alternators because the generator 9 itself rotates at high speed. Therefore, the auxiliary generator 54 can be used for the electric attachment 22 which requires more electricity than existing ones.

As illustrated in detail in FIG. 5, the output shaft 9*b* of the generator 9 is provided with a sixth gear 55 that rotates together with the output shaft 9*b*. Furthermore, a fourth shaft 57 extending in a direction parallel or substantially parallel to the output shaft 9*b* (in the front-rear direction) is provided outward of the output shaft 9*b* of the generator 9. The fourth shaft 57 is attached to be rotatable about an axis extending in the front-rear direction. A seventh gear 56 that meshes with the sixth gear 55 is attached to a rear portion of the fourth shaft 57. The seventh gear 56 is provided to rotate together with the fourth shaft 57. The auxiliary generator 54 described above is provided on a front portion of the fourth shaft 57.

That is, power from the output shaft 9*b* of the generator 9 is transmitted to the fourth shaft 57 via the sixth gear 55 and the seventh gear 56 meshing with the sixth gear 55, and electricity is generated by the auxiliary generator 54 that is attached to the front portion of the fourth shaft 57 to be rotatable together with the fourth shaft 57.

As illustrated in FIG. 7, in the hybrid system 25 of the second example embodiment, the auxiliary generator 54 generates electricity using the remaining power obtained by subtracting the power used for the electricity generation by the generator 9 from the power transmitted from the engine 7 to the generator 9. It is noted here that, since the rotational speed regarding the power used by the auxiliary generator 54 to generate electricity has been increased for the electricity generation by the generator 9, it is possible to obtain larger electricity from the auxiliary generator 54 than existing auxiliary generators. Therefore, the hybrid system 25 of the second example embodiment can actuate the electric attachment 22 that requires larger electricity than existing alternators or the like.

Note that configurations of the hybrid system 25 of the second example embodiment other than those described above may be the same as those of the first example embodiment. Therefore, description of the same configurations as those of the first example embodiment is omitted.

Third Example Embodiment

Next, a hybrid system 25 of a third example embodiment will be described.

Figure 6:
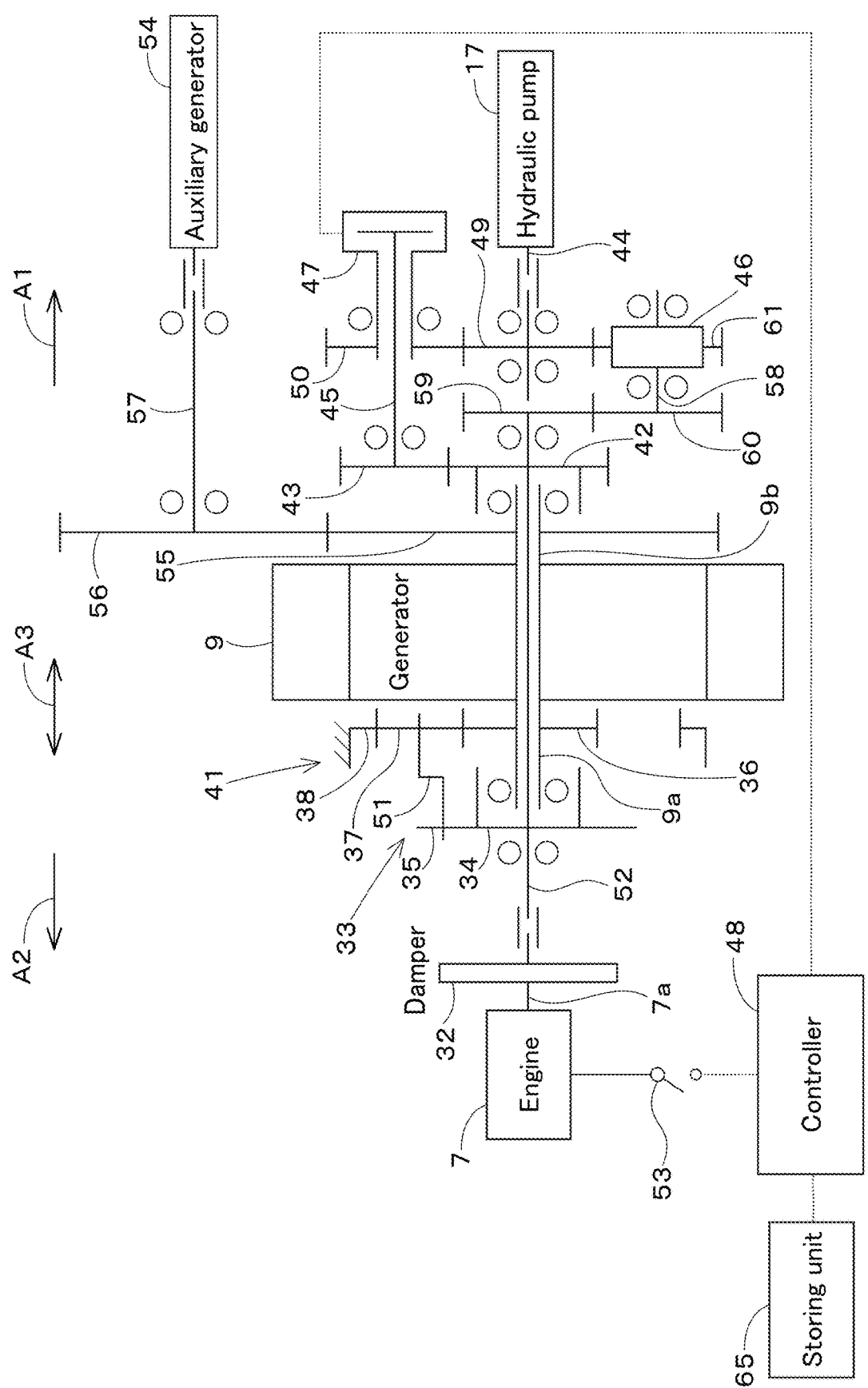
FIG. 6 is a schematic diagram of a hybrid system included in a compact track loader according to a third example embodiment of the present invention.

As illustrated in FIG. 6, in the hybrid system 25 of the third example embodiment, as in the second example embodiment, the sixth gear 55 is provided on the output shaft 9*b* of the generator 9, and the seventh gear 56 that meshes with the sixth gear 55 is provided on the fourth shaft 57 parallel or substantially parallel to the output shaft 9*b*. The remaining power obtained by subtracting the power used for the electricity generation by the generator 9 is transmitted to the auxiliary generator 54, and large electricity can be generated.

The hybrid system 25 of the third example embodiment differs from that of the second example embodiment in the location of the first clutch 46.

That is, the first clutch 46 of the second example embodiment is provided on the first shaft 44 provided in front of the transmission shaft 52 to be aligned coaxially with the transmission shaft 52. However, the first clutch 46 of the third example embodiment is provided on a fifth shaft 58 that is provided forward of the transmission shaft 52 but at a position offset radially outward from the transmission shaft 52.

Specifically, in the hybrid system 25 of the third example embodiment, an eighth gear 59 is attached to the front end of the transmission shaft 52 to be rotatable together with the transmission shaft 52. As described above, the fifth shaft 58 is provided radially outward of the transmission shaft 52 to be parallel or substantially parallel to the transmission shaft 52. That is, the transmission shaft 52 and the fifth shaft 58 are provided to have different axes. Furthermore, a ninth gear 60 that meshes with the eighth gear 59 is attached to the rear end of the fifth shaft 58 to be rotatable together with the fifth shaft 58. Note that the first clutch 46 is provided on the fifth shaft 58 similarly to the second example embodiment. That is, power transmitted to the transmission shaft 52 is transmitted to the fifth shaft 58 located radially outward of the transmission shaft 52 via the eighth gear 59 and the ninth gear 60, and is transmitted to the first clutch 46 provided on the fifth shaft 58.

Furthermore, a tenth gear 61 is provided at the front end of the fifth shaft 58 to be rotatable together with the fifth shaft 58. Furthermore, the first shaft 44 is provided with the fourth gear 49 which is a portion of the second transmission path 40, and the fourth gear 49 meshes with the tenth gear 61. Therefore, power transmitted to the first clutch 46 is transmitted to the first shaft 44 via the tenth gear 61 and the fourth gear 49, and is transmitted to the hydraulic pump 17.

That is, in the hybrid system 25 of the third example embodiment, the first transmission path 39 includes the eighth gear 59 and the ninth gear 60 which mesh with each other, the fifth shaft 58 provided radially outward of the transmission shaft 52, and the tenth gear 61 and the fourth gear 49 which mesh with each other.

As described above, the transmission 27 in the hybrid system 25 of the third example embodiment includes the third transmission path 41 to transmit power from the engine 7 to the generator 9, the first transmission path 39 and the second transmission path 40 are connected to the third transmission path 41, and the generator 9 and the hydraulic pump 17 are connected in parallel or substantially in parallel to the engine 7.

Fourth Example Embodiment

Next, a hybrid system 25 of a fourth example embodiment will be described.

Figure 8:
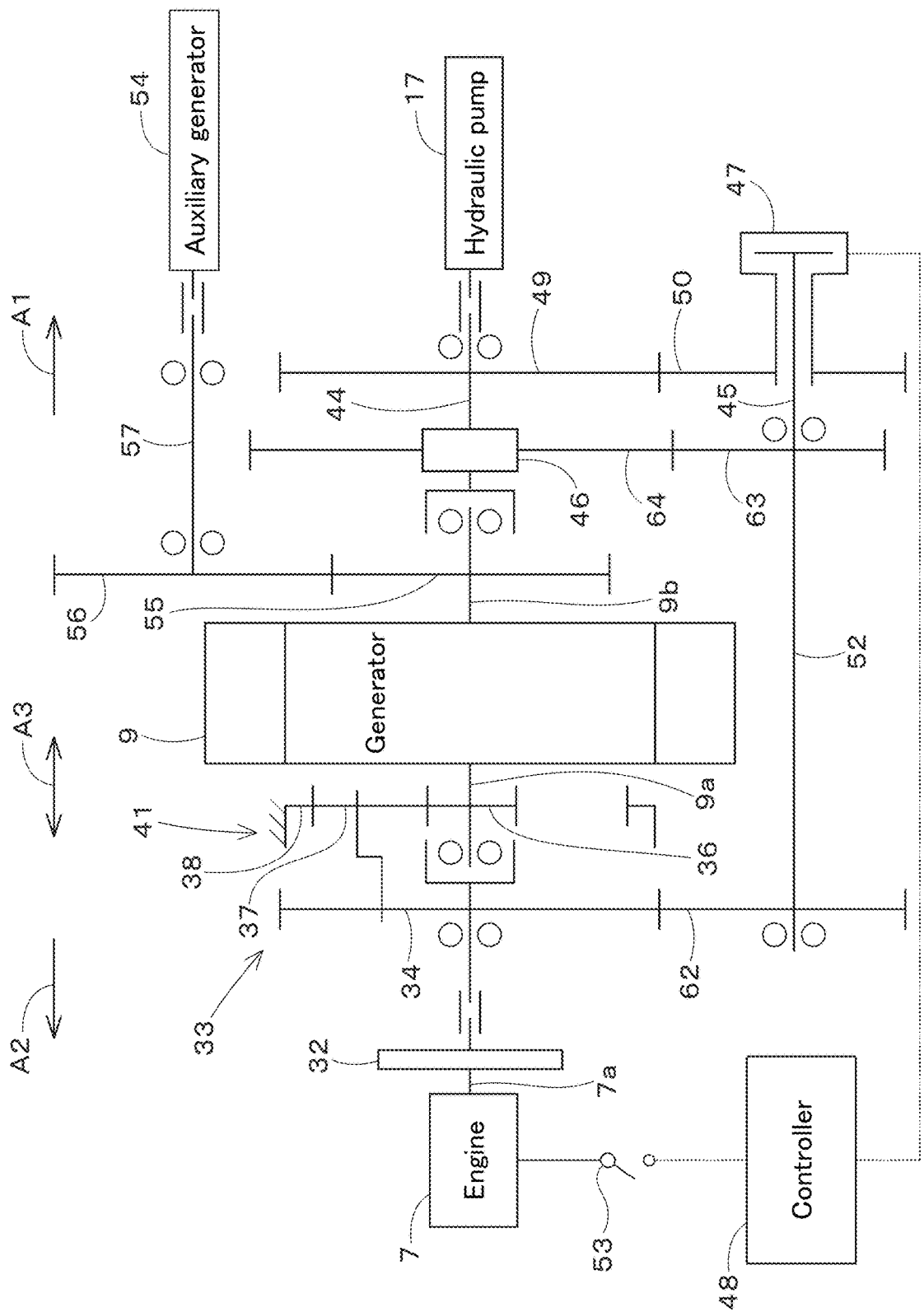
FIG. 8 is a schematic diagram of a hybrid system included in a compact track loader according to a fourth example embodiment of the present invention.

As illustrated in FIG. 8, in the hybrid system 25 of the fourth example embodiment, the transmission shaft 52 is provided radially outward of the generator 9. In other words, in the hybrid system 25 of the fourth example embodiment, the input shaft 9*a* and the output shaft 9*b* of the generator 9 are not hollow, and the transmission shaft 52 does not extend through the interior of the input shaft 9*a* or the output shaft 9*b*. The power from the engine 7 can be inputted into the transmission shaft 52 provided radially outward of the generator 9 via a plurality of gears.

Specifically, the carrier plate 34 is provided on the output shaft 7*a* of the engine 7 in front of the damper 32. The carrier plate 34 is attached to the output shaft 7*a* of the engine 7 to be rotatable together with the output shaft 7*a*. The input shaft 9*a* and the output shaft 9*b* of the generator 9 are provided in front of the output shaft 7*a*. The input shaft 9*a* and the output shaft 9*b* of the generator 9 are provided in front of the output shaft 7*a* with a distance therebetween, and the interior of each shaft is solid (not hollow). Therefore, in the hybrid system 25 of the fourth example embodiment, the transmission shaft 52 is provided in a bypass manner radially outward of the input shaft 9a and the output shaft 9b, more specifically, radially outward of the generator 9.

Furthermore, an eleventh gear 62 that meshes with the carrier plate 34 on the output shaft 7a is attached to the rear end of the transmission shaft 52 to be rotatable together with the transmission shaft 52. A twelfth gear 63 is attached to the front end of the transmission shaft 52 to be rotatable together with the transmission shaft 52. The second shaft 45 to transmit power to the second clutch 47 is provided in front of the twelfth gear 63 on the transmission shaft 52. That is, in the hybrid system 25 of the fourth example embodiment, the portion that is located rearward of the twelfth gear 63 is referred to as the transmission shaft 52, and the portion in front of the twelfth gear 63 is referred to as the second shaft 45.

Furthermore, the first shaft 44 is provided in front of the output shaft 9b of the generator 9 so as to be in front of the output shaft 9b with a difference therebetween. The first shaft 44 is provided with the first clutch 46 and a sixteenth gear 64 that meshes with the twelfth gear 63. The sixteenth gear 64 is attached to the first shaft 44 to be rotatable together with the first shaft 44.

That is, in the hybrid system 25 of the fourth example embodiment, power generated by the engine 7 is transmitted to the transmission shaft 52 via the carrier plate 34 and the eleventh gear 62, and is transmitted to the first clutch 46 and the second clutch 47 without passing through the generator 9. Specifically, the power transmitted to the transmission shaft 52 is transmitted to the first clutch 46 via the twelfth gear 63 and the sixteenth gear 64, and is transmitted to the hydraulic pump 17 via the first clutch 46 (the first transmission path 39). The power transmitted to the transmission shaft 52 is transmitted to the second clutch 47 via the second shaft 45, and is transmitted to the hydraulic pump 17 via the fourth gear 49, the fifth gear 50, and the first shaft 44.

In other words, the transmission 27 provided in the hybrid system 25 of the fourth example embodiment includes the third transmission path 41 to transmit power from the engine 7 to the generator 9, the first transmission path 39 and the second transmission path 40 are connected to the third transmission path 41, and the generator 9 and the hydraulic pump 17 are connected in parallel or substantially in parallel to the engine 7.

In the hybrid system 25 of the fourth example embodiment, the third transmission path 41 includes the transmission assembly 33 to transmit power from the output shaft 7a of the engine 7 to the input shaft 9a of the generator 9, the transmission assembly 33 being connected to the output shaft 7a, and the transmission shaft 52 to transmit the power from the output shaft 7a to the first transmission path 39 and the second transmission path 40, the transmission shaft 52 being connected to the output shaft 7a. The transmission shaft 52 extends in parallel or substantially in parallel to the input shaft 9a. The hybrid system 25 of the fourth example embodiment is advantageous, for example, when the output of the engine 7 or the generator 9 is large and the diameter of the output shaft 7a of the engine 7 or the diameters of the input shaft 9a and the output shaft 9b of the generator 9 need to be increased. That is, when the output of the engine 7 or the generator 9 increases, it is necessary to increase the diameter of the transmission shaft 52 to increase the strength of the transmission shaft 52. That is, the input shaft 9a and the output shaft 9b of the generator 9 can be hollow only when the output of the engine 7 or the generator 9 is small. In other words, the hybrid system 25 of the fourth example embodiment includes a structure in which the power transmission can be stably performed even when the engine 7 and the generator 9 are increased in size (increased in output), by placing the transmission shaft 52 radially outward of the generator 9 and increasing the shaft diameter.

Example embodiments of the present invention provide a hybrid system 25 and a working machine 1 including a hybrid system 25 described in the following items.

(Item 1) A hybrid system 25 including an engine 7, a generator 9 to be driven by the engine 7, an electric actuator 26 to be driven by electricity generated by the generator 9, a transmission 27 to transmit power from the engine 7, a hydraulic pump 17 to receive power from the engine 7 through the transmission 27 to deliver hydraulic fluid, and a hydraulic actuator 28 to be driven by hydraulic fluid delivered by the hydraulic pump 17, wherein the transmission 27 includes a first transmission path 39 to transmit power from the engine 7 to the hydraulic pump 17 when a rotational speed of the engine 7 is a first rotational speed R1, and a second transmission path 40 to transmit power from the engine 7 to the hydraulic pump 17 at a speed change ratio at which a rotational speed is increased to a greater degree than at a speed change ratio of the first transmission path 39 when the rotational speed of the engine 7 is a second rotational speed R2 that is lower than the first rotational speed R1.

With the hybrid system 25 according to item 1, even when the rotational speed of the engine 7 is switched between the first rotational speed R1 and the second rotational speed R2, the rotational speed transmitted to the hydraulic pump 17 can be maintained, and the hydraulic pump 17 can stably deliver hydraulic fluid.

(Item 2) The hybrid system 25 according to item 1, wherein the speed change ratios of the first transmission path 39 and the second transmission path 40 are such that a rotational speed inputted from the first transmission path 39 into the hydraulic pump 17 when the rotational speed of the engine 7 is the first rotational speed R1 is equal or substantially equal to a rotational speed inputted from the second transmission path 40 into the hydraulic pump 17 when the rotational speed of the engine 7 is the second rotational speed R2.

With the hybrid system 25 according to item 2, the rotational speed inputted from the first transmission path 39 into the hydraulic pump 17 when the rotational speed of the engine 7 is the first rotational speed R1 (when the first operation mode is selected) is equal or substantially equal to the rotational speed inputted from the second transmission path 40 into the hydraulic pump 17 when the rotational speed of the engine 7 is the second rotational speed R2 (when the second operation mode is selected), and the rotational speed transmitted to the hydraulic pump 17 is constant in both the first operation mode and the second operation mode.

(Item 3) The hybrid system 25 according to item 1 or 2, wherein the speed change ratio of the second transmission path 40 is a value obtained by dividing a product of the speed change ratio of the first transmission path 39 and the first rotational speed R1 by the second rotational speed R2.

With the hybrid system 25 according to item 3, even when the rotational speed of the engine 7 is changed between the first rotational speed R1 and the second rotational speed R2, the rotational speed transmitted to the hydraulic pump 17 can be maintained constant.

(Item 4) The hybrid system 25 according to any one of items 1 to 3, wherein the transmission 27 includes a first clutch 46 in the first transmission path 39, and the first clutch 46 is operable to transmit power from the first transmission path 39 to the hydraulic pump 17 when a rotational speed inputted into the first clutch 46 is higher than a rotational speed inputted from the second transmission path 40 into the hydraulic pump 17, and interrupt transmission of power from the first transmission path 39 to the hydraulic pump 17 when the rotational speed inputted into the first clutch 46 is lower than or equal to the rotational speed inputted from the second transmission path 40 into the hydraulic pump 17.

With the hybrid system 25 according to item 4, power is transmitted by the first clutch 46 when the rotational speed of the engine 7 inputted into the first clutch 46 via the first transmission path 39 is constant or increased, and the power transmission by the first clutch 46 is interrupted when the rotational speed is decreased. Thus, when the rotational speed is constant or increased, power can be transmitted to the hydraulic pump 17 via the first transmission path 39.

(Item 5) The hybrid system 25 according to item 4, wherein the transmission 27 includes a second clutch 47 in the second transmission path 40, and the second clutch 47 is operable to transmit power when the rotational speed of the engine 7 is the second rotational speed R2, and not transmit power when the rotational speed of the engine 7 is other than the second rotational speed R2.

With the hybrid system 25 according to item 5, when the rotational speed of the engine 7 inputted into the second clutch 47 via the second transmission path 40 decreases to the second rotational speed R2, power is transmitted by the second clutch 47. When the rotational speed of the engine 7 increases above or decreases below the second rotational speed R2, the transmission of power by the second clutch 47 is interrupted.

(Item 6) The hybrid system 25 according to any one of items 1 to 5, further including a mode switch 53 to receive an operation to select one of a plurality of modes, and a controller 48 to switch the rotational speed of the engine 7 to the first rotational speed R1 or to the second rotational speed R2 according to the operation received by the mode switch 53.

With the hybrid system 25 according to item 6, it is possible to easily know whether the operation mode of the engine 7 is the first operation mode or the second operation mode. Furthermore, by causing the controller 48 to adjust the opening/closing of the second clutch 47 in response to the switching of the mode switch 53, it is possible to adjust the power transmission via the second transmission path 40 in accordance with the operation mode of the engine 7.

(Item 7) The hybrid system 25 according to any one of items 1 to 6, further including an alternator 54 to generate electricity using power transmitted to the generator 9.

With the hybrid system 25 according to item 7, the auxiliary generator 54 (alternator) makes it possible to obtain larger electricity than existing generators or systems, using power in which the rotation speed has been increased for the electricity generation by the generator 9. Therefore, the hybrid system 25 of the second example embodiment can actuate the electric attachment 22 that consumes much electricity, as compared to existing systems.

(Item 8) The hybrid system 25 according to any one of items 1 to 7, wherein the transmission 27 includes a third transmission path 41 to transmit power from the engine 7 to the generator 9, and the first transmission path 39 and the second transmission path 40 are connected to the third transmission path 41, and the generator 9 and the hydraulic pump 17 are connected in series to the engine 7.

An example of such a transmission 27 would be a mechanism in which the third transmission path 41 includes a transmission assembly 33 to transmit power from an output shaft 7a of the engine 7 to an input shaft 9a of the generator 9, the transmission assembly 33 being connected to the output shaft 7a, and a transmission shaft 52 to transmit power from the output shaft 7a to the first transmission path 39 and the second transmission path 40, the transmission shaft 52 being connected to the output shaft 7a, and the input shaft 9a is hollow, and the transmission shaft 52 extends thorough an interior of the input shaft 9a.

The configuration in which the generator 9 and the hydraulic pump 17 are connected in series to the engine 7, such as the hybrid system 25 according to item 8, has a simple structure in which power can be transmitted without using many gears and/or the like, and is advantageous in that power from the engine 7 can be directly transmitted to the hydraulic pump 17 without attenuation.

(Item 9) The hybrid system 25 according to item 8, wherein the third transmission path 41 includes a transmission assembly 33 to transmit power from an output shaft 7a of the engine 7 to an input shaft 9a of the generator 9, the transmission assembly 33 being connected to the output shaft 7a, and a transmission shaft 52 to transmit power from the output shaft 7a to the first transmission path 39 and the second transmission path 40, the transmission shaft 52 being connected to the output shaft 7a, and the input shaft 9a is hollow, and the transmission shaft 52 extends through an interior of the input shaft 9a.

The hybrid system 25 according to item 9 is advantageous, for example, when it is not possible to secure a space for placement of the first shaft 44 in front of the transmission shaft 52, that is, between the transmission shaft 52 and the hydraulic pump 17. That is, with the hybrid system 25 according to the third example embodiment, since the first transmission path 39 and the second transmission path 40 are provided in a bypass manner radially outward of the transmission shaft 52, it is advantageous in that the transmission 27 can be laid out even when only a small space is available.

(Item 10) The hybrid system 25 according to any one of items 1 to 7, wherein the transmission 27 includes a third transmission path 41 to transmit power from the engine 7 to the generator 9, and the first transmission path 39 and the second transmission path 40 are connected to the third transmission path 41, and the generator 9 and the hydraulic pump 17 are connected in parallel or substantially in parallel to the engine 7.

The hybrid system 25 according to item 10 is advantageous when it is not possible to ensure a sufficient space for the transmission 27 in the front-rear direction. That is, with the hybrid system 25, since the first transmission path 39 and the second transmission path 40 are provided in a bypass manner radially outward of the transmission shaft 52, it is advantageous in that the transmission 27 can be laid out even when only a small space is available in the front-rear direction.

(Item 11) The hybrid system 25 according to item 10, wherein the third transmission path 41 includes a transmission assembly 33 to transmit power from an output shaft 7a of the engine 7 to an input shaft 9a of the generator 9, the transmission assembly 33 being connected to the output shaft 7a, and a transmission shaft 52 to transmit power from the output shaft 7a to the first transmission path 39 and the second transmission path 40, the transmission shaft 52 being connected to the output shaft 7a, and the transmission shaft 52 extends in parallel or substantially in parallel to the input shaft 9a.

With the hybrid system 25 according to item 11, a shaft having a larger diameter than in cases of a hollow structure can be used as the transmission shaft 52 provided in parallel or substantially in parallel to the input shaft 9a. Thus, it is possible to obtain a structure capable of stably transmitting power even when the engine 7 and the generator 9 are increased in size.

(Item 12) The hybrid system 25 according to any one of items 1 to 7, wherein the transmission 27 includes a third transmission path 41 to transmit power from the engine 7 to the generator 9, the third transmission path 41 includes a transmission assembly 33 to transmit power from an output shaft 7a of the engine 7 to an input shaft 9a of the generator 9, the transmission assembly 33 being connected to the output shaft 7a, and the transmission assembly 33 is operable to transmit power received from the output shaft 7a while increasing a rotational speed and transmit the power to the input shaft 9a.

With the hybrid system 25 according to item 12, the rotational speed can be increased by making good use of the space behind the generator 9, resulting in an improvement in the degree of freedom in designing the device layout of the hybrid system 25.

(Item 13) A working machine 1 including the hybrid system 25 according to any one of items 1 to 12, a machine body 2, and a traveling device 4 to be driven by the electric actuator 26 and to support the machine body 2 such that the machine body 2 is allowed to travel, and a working device 3 to be driven by the hydraulic actuator 28.

With the working machine 1 according to item 13, even when the rotational speed of the engine 7 is switched between the first rotational speed R1 and the second rotational speed R2, the rotational speed of the hydraulic pump 17 can be kept constant, making it possible to generate stable hydraulic pressure and flow rate to get the most out of the performance of the working device 3.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hybrid system comprising:
    an engine;
    a generator to be driven by the engine;
    an electric actuator to be driven by electricity generated by the generator;
    a transmission to transmit power from the engine;
    a hydraulic pump to receive power from the engine through the transmission to deliver hydraulic fluid; and
    a hydraulic actuator to be driven by hydraulic fluid delivered by the hydraulic pump; wherein
    the transmission includes:
        a first transmission path to transmit power from the engine to the hydraulic pump when a rotational speed of the engine is a first rotational speed; and
        a second transmission path to transmit power from the engine to the hydraulic pump at a speed change ratio at which a rotational speed is increased to a greater degree than at a speed change ratio of the first transmission path when the rotational speed of the engine is a second rotational speed that is lower than the first rotational speed; and
        a third transmission path to transmit power from the engine to the generator;
    the first transmission path and the second transmission path are connected to the third transmission path, and the generator and the hydraulic pump are connected in series to the engine;
    the third transmission path includes:
        a transmission assembly to transmit power from an output shaft of the engine to an input shaft of the generator, the transmission assembly being connected to the output shaft; and
        a transmission shaft to transmit power from the output shaft to the first transmission path and the second transmission path, the transmission shaft being connected to the output shaft; and
    the input shaft is hollow, and the transmission shaft extends through an interior of the input shaft.

2. The hybrid system according to claim 1, wherein the speed change ratios of the first transmission path and the second transmission path are such that a rotational speed inputted from the first transmission path into the hydraulic pump when the rotational speed of the engine is the first rotational speed is equal or substantially equal to a rotational speed inputted from the second transmission path into the hydraulic pump when the rotational speed of the engine is the second rotational speed.

3. The hybrid system according to claim 2, wherein the speed change ratio of the second transmission path is a value obtained by dividing a product of the speed change ratio of the first transmission path and the first rotational speed by the second rotational speed.

4. The hybrid system according to claim 1, wherein
    the transmission includes a first clutch in the first transmission path; and
    the first clutch is operable to transmit power from the first transmission path to the hydraulic pump when a rotational speed inputted into the first clutch is higher than a rotational speed inputted from the second transmission path into the hydraulic pump, and interrupt transmission of power from the first transmission path to the hydraulic pump when the rotational speed inputted into the first clutch is lower than or equal to the rotational speed inputted from the second transmission path into the hydraulic pump.

5. The hybrid system according to claim 4, wherein
    the transmission includes a second clutch in the second transmission path; and
    the second clutch is operable to transmit power when the rotational speed of the engine is the second rotational speed, and not transmit power when the rotational speed of the engine is other than the second rotational speed.

6. The hybrid system according to claim 1, further comprising:
    a mode switch to receive an operation to select one of a plurality of modes; and
    a controller to switch the rotational speed of the engine to the first rotational speed or to the second rotational speed according to the operation received by the mode switch.

7. The hybrid system according to claim 1, further comprising:
    an alternator to generate electricity using power transmitted to the generator.

8. The hybrid system according to claim 1, wherein
    the transmission assembly is operable to transmit power received from the output shaft while increasing a rotational speed and transmit the power to the input shaft.

9. A working machine comprising:
    the hybrid system according to claim 1;
    a machine body;

a traveling device to be driven by the electric actuator and to support the machine body such that the machine body is allowed to travel; and a working device to be driven by the hydraulic actuator.

10. A hybrid system comprising:

an engine;

a generator to be driven by the engine;

an electric actuator to be driven by electricity generated by the generator;

a transmission to transmit power from the engine;

a hydraulic pump to receive power from the engine through the transmission to deliver hydraulic fluid; and a hydraulic actuator to be driven by hydraulic fluid delivered by the hydraulic pump; wherein the transmission includes:

a first transmission path to transmit power from the engine to the hydraulic pump when a rotational speed of the engine is a first rotational speed; and a second transmission path to transmit power from the engine to the hydraulic pump at a speed change ratio at which a rotational speed is increased to a greater degree than at a speed change ratio of the first transmission path when the rotational speed of the engine is a second rotational speed that is lower than the first rotational speed; and between the engine and the generator, a planetary gear mechanism, including a carrier plate by which power from the engine is divided into two power flows, a sun gear, a carrier gear, and an internal gear, is defined, the planetary gear mechanism is defined such that one of the two power flows divided by the carrier plate is transmitted to the generator via the sun gear, the carrier gear, and the internal gear, and another one of the two power flows divided by the carrier plate is transmitted to the transmission without passing through the sun gear, the carrier gear, and the internal gear.

11. The hybrid system according to claim 10, wherein the transmission includes a third transmission path to transmit power from the engine to the generator; and the first transmission path and the second transmission path are connected to the third transmission path, and the generator and the hydraulic pump are connected in parallel or substantially in parallel to the engine.

12. The hybrid system according to claim 11, wherein the third transmission path includes:

a transmission assembly to transmit power from an output shaft of the engine to an input shaft of the generator, the transmission assembly being connected to the output shaft; and a transmission shaft to transmit power from the output shaft to the first transmission path and the second transmission path, the transmission shaft being connected to the output shaft; and the transmission shaft extends in parallel or substantially in parallel to the input shaft.

13. A working machine comprising:

the hybrid system according to claim 10;

a machine body;

a traveling device to be driven by the electric actuator and to support the machine body such that the machine body is allowed to travel; and a working device to be driven by the hydraulic actuator.

* * * * *